(No Model.)   2 Sheets—Sheet 1.
H. J. DOERR.
AIR PUMP.
No. 378,666.   Patented Feb. 28, 1888.
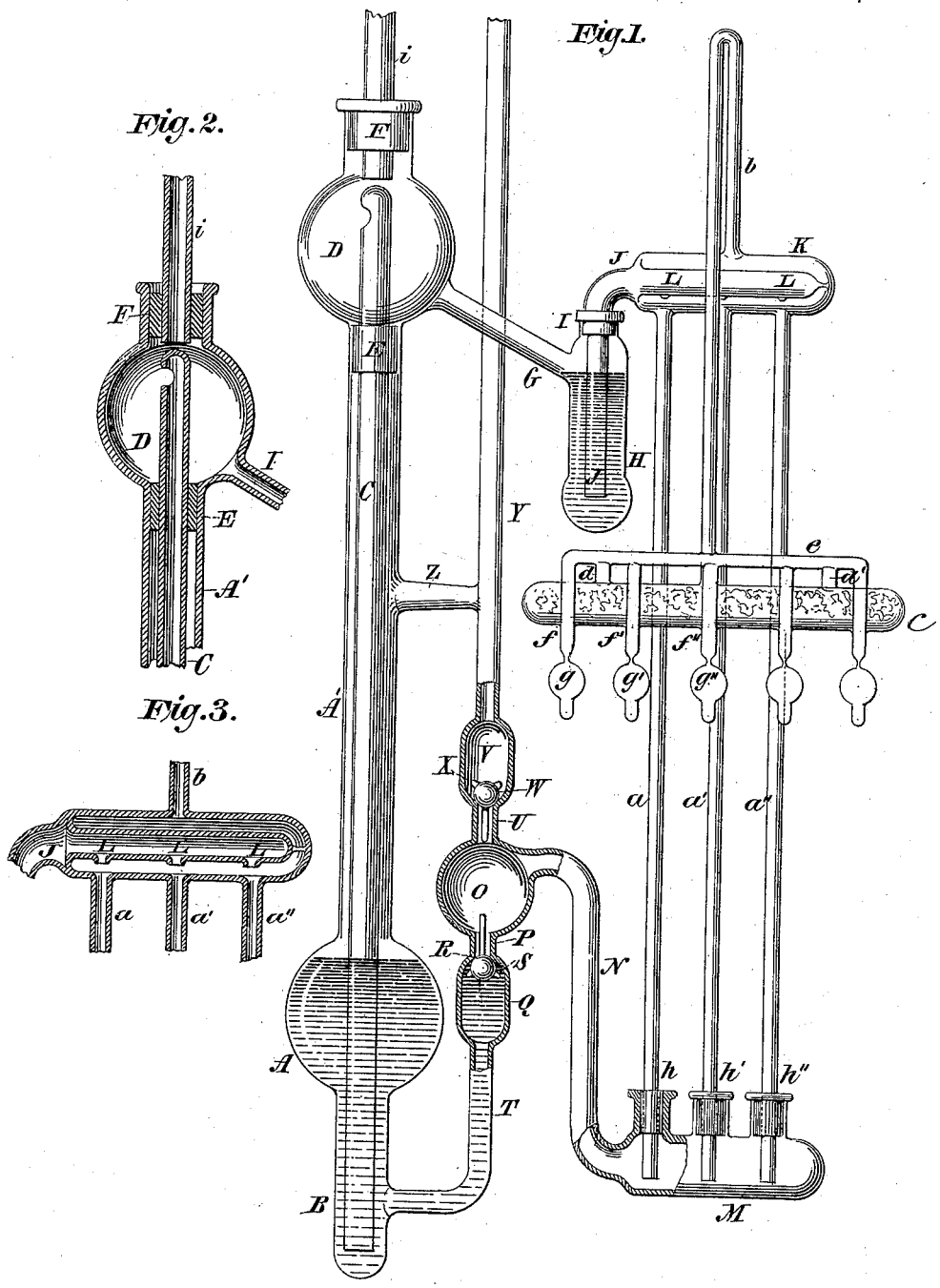
WITNESSES:
Gustave Dieterich
Edgar Goodwin
INVENTOR.
Henry J. Doerr
BY Carl Benjamin
his ATTORNEY.

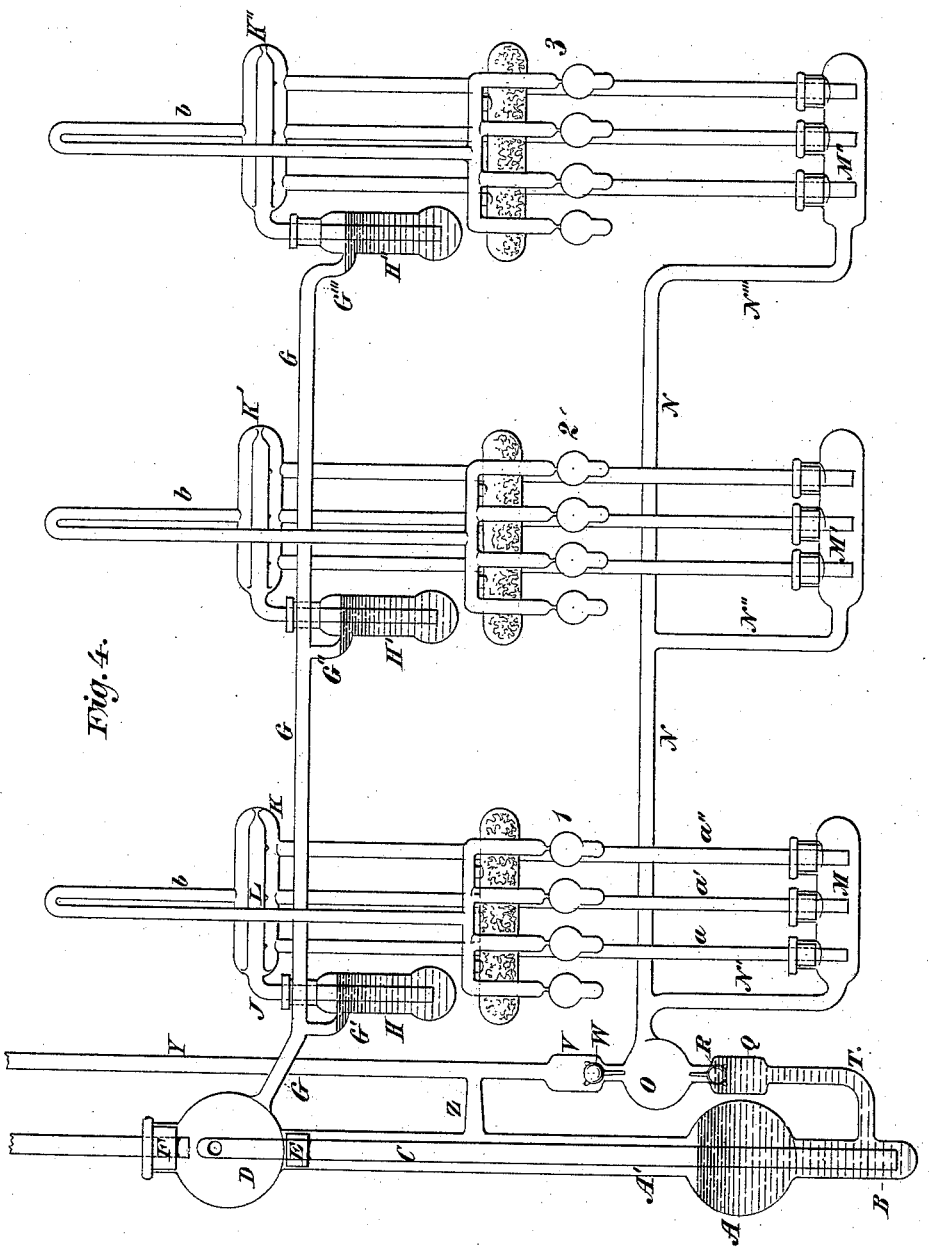

UNITED STATES PATENT OFFICE.

HENRY J. DOERR, OF NEWARK, NEW JERSEY.

AIR-PUMP.

SPECIFICATION forming part of Letters Patent No. 378,666, dated February 28, 1888.

Application filed November 16, 1887. Serial No. 255,300. (No model.)

*To all whom it may concern:*

Be it known that I, HENRY J. DOERR, of Newark, Essex county, New Jersey, have invented a new and useful Improvement in Air-Pumps, of which the following is a specification.

My invention relates to a novel form of air-pump of the Sprengel type, wherein air is exhausted by the descent of a jet or of jets of mercury in a vertical tube or tubes.

My invention consists in the construction hereinafter set forth, whereby a continuous and steady flow of the mercury is effected, whereby one mercury-elevating apparatus will suffice for the operation of several sets of mercury-tubes, and whereby the parts of the device can be easily separated to allow of cleansing, &c.

In the accompanying drawings, Figure 1 is an elevation and partial section of my new pump. Fig. 2 is a vertical section of the upper mercury-reservoir. Fig. 3 is a vertical section of the mercury-jet discharge-tube, and Fig. 4 shows my mercury-elevating apparatus in combination with several sets of fall-tubes.

Similar letters of reference indicate like parts.

A is the main mercury-reservoir having a downward extension, B. From the reservoir A rises a tube, A', on the upper end of which is a bulb or reservoir, D. In the opening in the top of the reservoir D, and in the tube A' just below said reservoir, are air-tight plugs E F. Passing through the plug E is the tube C. At its upper extremity tube C is closed; but near said extremity it has a delivery-orifice. The tube C extends nearly to the bottom of the downward extension B of the reservoir A, and is open.

From the lower portion of the reservoir D a pipe, G, leads to the vessel H. In the upper part of said vessel is a stopper, I, through which passes a tube, J, the open lower end of which is near the bottom of vessel H. The vessel H thus forms an air-trap, to prevent any air in the mercury from being carried into the fall-tubes. The tube J leads into a chamber, K, in which it is hermetically sealed. In the side of said tube J are several openings, L. Extending between the lower portion of chamber K and the upper portion of a similar chamber, M, is a series of fall-tubes, $a$ $a'$ $a''$, &c.

The chamber M communicates by a pipe, N, with the upper portion of a bulb, O. At the lower part of bulb O is a passage, P, communicating with the valve-chamber Q. In said chamber is a valve, R, provided with projections S on its lower side, so that said valve can close the opening between the passage P and chamber Q, but not the opening from chamber Q to pipe T, which communicates, as shown, with the extension B of reservoir A.

Opening into the upper part of chamber Q is a short pipe, U, communicating with another valve-chamber, V. In this chamber is a valve, W, provided with projections X on its upper side. Said valve may therefore close the opening from chamber V to passage U, but not from chamber V to pipe Y. Pipe Y communicates with tube A' by the connecting-tube Z.

From the upper part of chamber K the exhaust-tube $b$ communicates with chamber $c$, in which phosphoric anhydride or any other suitable material for drying the air exhausted from the lamps may be placed. Chamber $c$ communicates by pipes $d'$ $d'$ with pipe $e$, to which connect the pipes $f$ $f'$ $f''$, &c., to which the lamp-bulbs $g$ $g'$ $g''$, &c., are secured.

The chamber M is provided with stoppers $h$ $h'$ $h''$, through which pass the ends of the fall-tubes $a$ $a'$ $a''$. By removing said fall-tubes from said stoppers and the tube J from the stopper I the apparatus can be taken apart for purposes of cleansing, &c.

The operation of the apparatus is as follows: A vacuum-pump of any ordinary mechanical construction is to be applied to the tube $i$, which enters the reservoir D through the upper stopper, F. A pump producing alternately vacuum and plenum is to be applied to the end of tube Y. Suppose that the last-mentioned pump first forces air into tube Y. The valve W will then be forced down upon its seat and hermetically closed. The air will pass into tube A', and, pressing on the mercury, will force the same up through the tube C and into reservoir D. This upward flow of the mercury will be assisted by the vacuum caused in reservoir D by the pump, which constantly draws out air through the tube $i$. Meanwhile the pressure on the mercury-column in reservoir A, extension B, pipe T, and valve-chamber Q forces the valve S tightly to its seat. From the reservoir D the mercury passes by the pipe G through the air-seal H to the tube J, whence it falls through the fall-tubes $a$ $a'$ $a''$. In this way, as is well known, air may be entrained by the descending mercury and drawn out of the lamp-bulbs through the pipe $b$. The mercury and entrained air then pass into chamber M, and so to bulb O. On the exhaust-stroke of the pump connected with tube Y the air in bulb O is drawn out through said tube, the valve W lifting. At the same time, however, air is exhausted in the tube A' above the mercury in reservoir A. There is also the constant vacuum maintained in tube C. The vacuum produced in bulb O obviously draws the mercury through the system and into said bulb. Now the mercury which has traversed the system has been taken from reservoir A, and hence the mercury-level in said reservoir will have fallen. The moment, therefore, that the vacuum is produced above the mercury in reservoir A the weight of the mercury which has entered bulb O is free to push down the valve R, opening the same, when the mercury in the bulb O flows into valve-chamber Q, and so back by pipe T to reservoir A.

Referring, now, to Fig. 4, I have here illustrated my invention as arranged with several sets of fall-tubes. The tubes G and N are extended, as shown. With the tube G the air-seals H H' H'' communicate by branch tubes G' G'' G''', and with the tube N the chambers M M' M'' communicate by branch pipes N' N'' N'''. The mercury from reservoir D passes along the tube G, and is distributed to the three sets of fall-tubes, 1 2 3, through the air-seals H H' H'' and chambers K K' K''. Then from the chambers M M' M'' the mercury passes to the tube N, and so to bulb O, as already explained. By this construction I am enabled to exhaust three sets of lamps simultaneously by the aid of a single mercury-elevating device, as shown on the left of Fig. 4, thus greatly augmenting the economy of construction, as well as the capacity of the apparatus.

I claim—

1. The mercury-reservoir A, tube A', closed at its upper extremity, upper mercury-reservoir, D, suction-pipe C, extending between reservoirs A and D, tube Y, bulb O, communicating with said tube Y, a valve seated in tube Y above bulb O and opening upwardly, a pipe, T, communicating with bulb O and the lower portion of mercury-reservoir A, a valve seated in pipe T below bulb O and opening downwardly, and a connecting-pipe, Z, between tube Y and tube A', in combination with a mercury-delivery tube, J, communicating with reservoir D, a chamber, K, fall-tube $a$, chamber M, pipe N, leading from chamber M to bulb O, and exhaust-pipe leading from chamber K, substantially as described.

2. The mercury-reservoir A, tube A', closed at its upper extremity, upper mercury-reservoir, D, suction-pipe C, extending between reservoirs A and D, tube Y, bulb O, communicating with said tube Y, a valve seated in tube Y above bulb O and opening upwardly, a pipe, T, communicating with bulb O and the lower portion of mercury-reservoir A, a valve seated in pipe T below bulb O and opening downwardly, and a connecting-pipe, Z, between tube Y and tube A', and pipes G and N, leading, respectively, from reservoir D and bulb O, in combination with (1) a series of fall-tubes, as $a$ $a'$ $a''$, chamber K, chamber M, exhaust-tube communicating with chamber K and branch tubes G' and N', the said branch tubes extending, respectively, between chamber K and tube G and chamber M and tube N, and (2) a second series of fall-tubes, chamber K', chamber M', exhaust-tube communicating with chamber, and branch tubes G'' and N'', the said branch tubes extending, respectively, between chamber K' and tube G and chamber M' and tube N, substantially as described.

HENRY J. DOERR.

Witnesses:
PARK BENJAMIN,
EDGAR GOODWIN.